(12) United States Patent
Nakajima

(10) Patent No.: US 11,453,251 B2
(45) Date of Patent: Sep. 27, 2022

(54) PNEUMATIC TIRE

(71) Applicant: SUMITOMO RUBBER INDUSTRIES, LTD., Hyogo (JP)

(72) Inventor: Hiroki Nakajima, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 210 days.

(21) Appl. No.: 16/056,056

(22) Filed: Aug. 6, 2018

(65) Prior Publication Data
US 2019/0047332 A1 Feb. 14, 2019

(30) Foreign Application Priority Data

Aug. 9, 2017 (JP) .............................. JP2017-154021

(51) Int. Cl.
*B60C 15/06* (2006.01)
*C08L 7/00* (2006.01)
(Continued)

(52) U.S. Cl.
CPC ........ *B60C 15/0628* (2013.01); *B60C 1/0041* (2013.01); *B60C 15/04* (2013.01); *B60C 15/06* (2013.01); *B60C 15/0603* (2013.01); *B60C 15/0607* (2013.01); *C08L 7/00* (2013.01); *B60C 2001/005* (2013.01); *B60C 2009/0246* (2013.01); *B60C 2009/0276* (2013.01); *B60C 2009/2041* (2013.01); *B60C 2015/0614* (2013.01); *B60C 2015/0621* (2013.01); *B60C 2015/0678* (2013.01)

(58) Field of Classification Search
CPC ...... B60C 2001/005; B60C 2001/0058; B60C 1/0025; B60C 1/00; B60C 15/0628
See application file for complete search history.

(56) References Cited

U.S. PATENT DOCUMENTS 5,526,859 A * 6/1996 Saito ...................... B60C 1/0025
                                                              152/209.4
5,929,157 A * 7/1999 Matsuo ................. B60C 1/0025
                                                              524/492
(Continued)

FOREIGN PATENT DOCUMENTS

JP       2004306658 A  * 11/2004
JP       2014179768 A  *  9/2014
(Continued)

*Primary Examiner* — Cedrick S Williams
(74) *Attorney, Agent, or Firm* — Studebaker & Brackett PC

(57) ABSTRACT

A pneumatic tire having a tread, a sidewall, a bead portion having a bead core, a bead reinforcing layer reinforcing the bead portion, and a carcass ply moored on a bead core of the bead portion, wherein the bead reinforcing layer and adjacent members adjacent to the bead reinforcing layer are each composed of a rubber composition containing an amine type antioxidant, 0.3 to 8 parts by mass of the amine type antioxidant is contained in the bead reinforcing layer based on 100 parts by mass of the rubber component, and the adjacent member adjacent to the bead reinforcing layer and the bead reinforcing layer satisfy the following formula:

$2 \le B/A \le 8$

A: Content (wt %) of amine type antioxidant in bead reinforcing layer.
B: Content (wt %) of amine type antioxidant in the adjacent member.

16 Claims, 3 Drawing Sheets

(51) Int. Cl.
   *B60C 1/00*   (2006.01)
   *B60C 15/04*  (2006.01)
   *B60C 9/02*   (2006.01)
   *B60C 9/20*   (2006.01)

(56) References Cited

U.S. PATENT DOCUMENTS

| | | | | |
|---|---|---|---|---|
| 2005/0049351 | A1* | 3/2005 | D'Sidocky | B60C 15/06 524/492 |
| 2011/0114240 | A1* | 5/2011 | Skurich | C08L 7/00 152/554 |
| 2012/0234452 | A1* | 9/2012 | Miyazaki | C08L 81/02 152/541 |
| 2014/0102611 | A1* | 4/2014 | Miyazaki | B60C 1/00 152/450 |
| 2015/0126698 | A1* | 5/2015 | Kojima | C08F 236/06 526/335 |
| 2015/0210118 | A1* | 7/2015 | Miyazaki | B60C 1/0041 152/564 |
| 2016/0311257 | A1* | 10/2016 | Miyazaki | C08L 61/04 |
| 2017/0072750 | A1* | 3/2017 | Munezawa | B60C 9/14 |
| 2017/0274710 | A1* | 9/2017 | Matsumoto | B60C 15/06 |
| 2018/0258260 | A1* | 9/2018 | Tokimune | B60C 1/0025 |
| 2020/0269634 | A1* | 8/2020 | Castellani | B60C 1/0016 |

FOREIGN PATENT DOCUMENTS

| | | | |
|---|---|---|---|
| JP | 2016-078564 A | 5/2016 | |
| JP | 5914540 B2 * | 5/2016 | C08F 8/42 |
| JP | 2016-130053 A | 7/2016 | |
| JP | 2016-147567 A | 8/2016 | |

\* cited by examiner

PNEUMATIC TIRE

TECHNICAL FIELD

The present invention relates to a pneumatic tire, and more particularly to a pneumatic tire having a bead reinforcing layer, which suppresses the migration of the amine type antioxidant to the bead reinforcing layer, thereby suppressing change in the performance of the bead reinforcing layer and the tire.

BACKGROUND ART

A pneumatic tire (hereinafter also referred to as "tire" simply) is provided with a tread, a sidewall, a bead portion and the like, and the bead portion is provided with a bead apex extending in the radial direction from the bead core. The bead apex is a member contributing to the rigidity and durability of the tire. In recent years, the demand for further improvement of the rigidity and durability of the tire is increasing more and more.

In order to respond to such a demand, a technology is proposed for improving the rigidity and durability of a tire by suppressing deformation of the bead apex by disposing the bead reinforcing layer on the axially outer side of the tire bead apex (See, for example, Patent Documents 1 to 3).

In the case of this technique, sidewalls and clinches are disposed adjacent to each other further outside the bead reinforcing layer in the tire axial direction. Since these adjacent members are always exposed to the outside world, it is necessary to maintain crack resistance against ozone cracks and the like for a long period of time. Therefore, these adjacent members contain a comparatively large amount of amine type antioxidant having an excellent ozone resistance effect.

PRIOR ART DOCUMENT

Patent Document

[Patent Document 1] JP-A-2016-78564
[Patent Document 2] JP-A-2016-130053
[Patent Document 3] JP-A-2016-147567

SUMMARY OF THE INVENTION

Problems to be Solved by the Invention

However, in the conventional bead reinforcing layer, the content of the antioxidant was small. Therefore, when the adjacent member and the bead reinforcing layer of the conventional formulation are disposed adjacent to each other, the antioxidant is migrated from the adjacent member having a high content to the bead reinforcing layer having a small content at the interface between them, and in the bead reinforcing layer and the tire, various performance deteriorations such as an increase in heat generation, a decrease in rigidity due to heat generation, a decrease in steering stability, and the like were caused.

Accordingly, an object of the present invention is to provide a pneumatic tire in which an adjacent member containing a large amount of amine type antioxidant is disposed adjacent to the bead reinforcing layer, and the migration of the amine type antioxidant from the adjacent member to the bead reinforcing layer is suppressed.

Means for Solving the Problems

The inventors of the present invention have conducted intensive studies and have found that the above-mentioned problems can be solved by the inventions described below, and have completed the present invention.

The first aspect of the present invention (Invention 1) is a pneumatic tire comprising a tread, a sidewall, a bead portion having a bead core, a bead reinforcing layer reinforcing the bead portion, and a carcass ply moored on a bead core of the bead portion, wherein the bead reinforcing layer and adjacent members adjacent to the bead reinforcing layer are each composed of a rubber composition containing an amine type antioxidant, 0.3 to 8 parts by mass of the amine type antioxidant is contained in the bead reinforcing layer based on 100 parts by mass of the rubber component, the adjacent member adjacent to the bead reinforcing layer and the bead reinforcing layer satisfy the following formula.

$$3 \leq B/A \leq 8$$

A: Content (wt %) of amine type antioxidant in bead reinforcing layer
B: Content (wt %) of amine type antioxidant in the adjacent member The second aspect of the present invention (Invention 2) is the pneumatic according to Invention 1, wherein the adjacent members adjacent to the bead reinforcing layer are sidewalls or clinches, and the bead reinforcing layer is provided outside the end portion of the carcass ply in the axial direction of the tire.

The third aspect of the present invention (Invention 3) is the pneumatic tire according to Invention 1 or 2, wherein the rubber composition constituting the bead reinforcing layer has a tan δ at 70° C. of 0.14 or less.

The fourth aspect of the present invention (Invention 4) is the pneumatic tire according to any one of Inventions 1 to 3, wherein the rubber composition constituting the bead reinforcing layer has a tan δ at 70° C. of 0.09 or less.

The fifth aspect of the present invention (Invention 5) is the pneumatic tire according to any one of Inventions 1 to 4, wherein the rubber composition constituting the bead reinforcing layer has an E* at 70° C. of 10 MPa or more.

The sixth aspect of the present invention (Invention 6) is the pneumatic tire according to any one of Inventions 1 to 5, wherein the rubber composition constituting the bead reinforcing layer has E* at 70° C. of 50 MPa or more at 70° C.

The seventh aspect of the present invention (Invention 7) is the $_p$neumatic tire according to any one of Inventions 1 to 6, wherein the rubber composition constituting the bead reinforcing layer contains 30 to 60 parts by mass of carbon black having a cetyltrimethylammonium bromide (CTAS) adsorption specific surface area of 30 to 50 m$^2$/g or 10 to 25 parts by mass of calcium carbonate based on 100 parts by mass of the rubber component.

Effect of the Invention

According to the present invention, a pneumatic tire is provided in which an adjacent member containing a large amount of amine type antioxidant is disposed adjacent to the bead reinforcing layer, and migration of the amine type antioxidant from the adjacent member to the bead reinforcing layer is suppressed.

EMBODIMENTS FOR CARRYING OUT THE INVENTION

Hereinafter, the present invention will be described based on embodiments.

1. Summary of the Invention

The pneumatic tire according to the present invention comprises a tread, a sidewall, a bead portion having a bead core, a bead reinforcing layer reinforcing the bead portion and a carcass ply moored on a bead core of the bead portion, and it has the following characteristics.

Adjacent members adjacent to the bead reinforcing layer and the bead reinforcing layer are each composed of a rubber composition containing an amine type antioxidant, 0.3 to 8 parts by mass of the amine type antioxidant is contained in the bead reinforcing layer based on 100 parts by mass of the rubber component, and the adjacent member adjacent to the bead reinforcing layer and the bead reinforcing layer satisfy the following formula.

$$3 \leq B/A \leq 8$$

A: Content (wt %) of amine type antioxidant in bead reinforcing layer
B: Content (wt %) of amine type antioxidant in the adjacent member The inventors of the present invention have studied for solving the above-mentioned problems, and found that migration of the amine type antioxidant from the adjacent member to the bead reinforcing layer (hereinafter also simply referred to as "migration of the antioxidant") can be suppressed, when the content of the amine type antioxidant relative to 100 parts by mass of the rubber component of the bead reinforcing layer is set to 0.3 to 8 parts by mass and the ratio (B/A) of the content A (wt %) of the amine type antioxidant in the bead reinforcing layer and the content B (wt %) of the amine type antioxidant in the adjacent member is set to 3 to 8.

By suppressing the migration of the antioxidant in this manner, it was found that various performance deteriorations occurred in the bead reinforcing layer and the tire due to the migration of the antioxidant can be suppressed. In addition, it has been found that such an effect is remarkably exerted and, therefore, preferable when the bead reinforcing layer of the tire is made to have low heat generation and high rigidity in order to reduce the fuel consumption.

2. Embodiment

Figure 1:
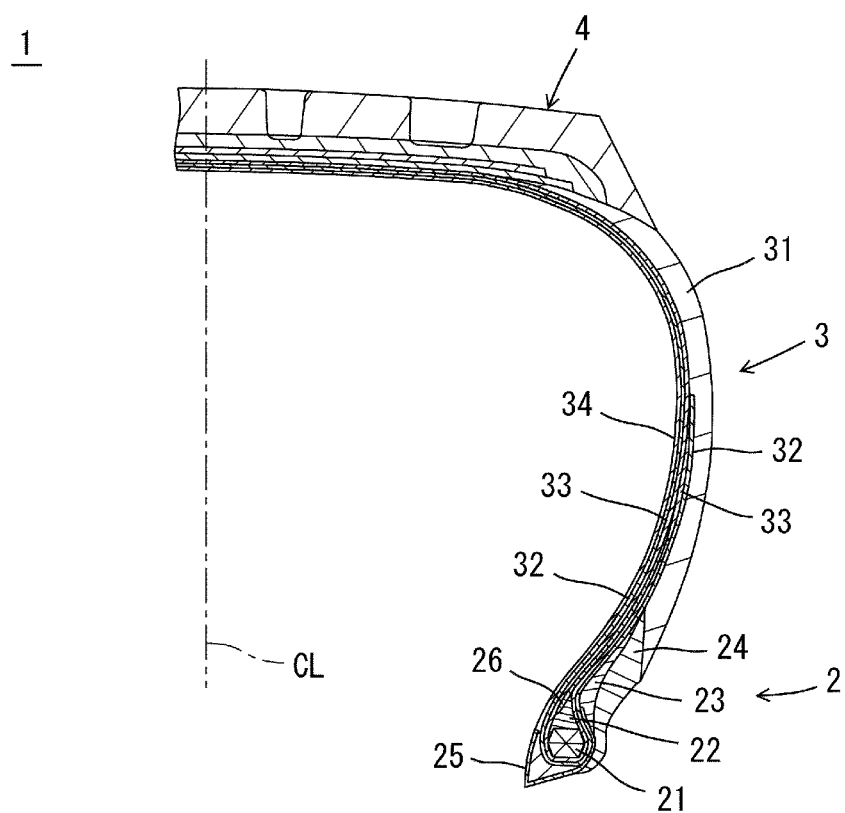
FIG. 1 is a cross-sectional view showing a configuration of a pneumatic tire according to an embodiment of the present invention.
Figure 2:
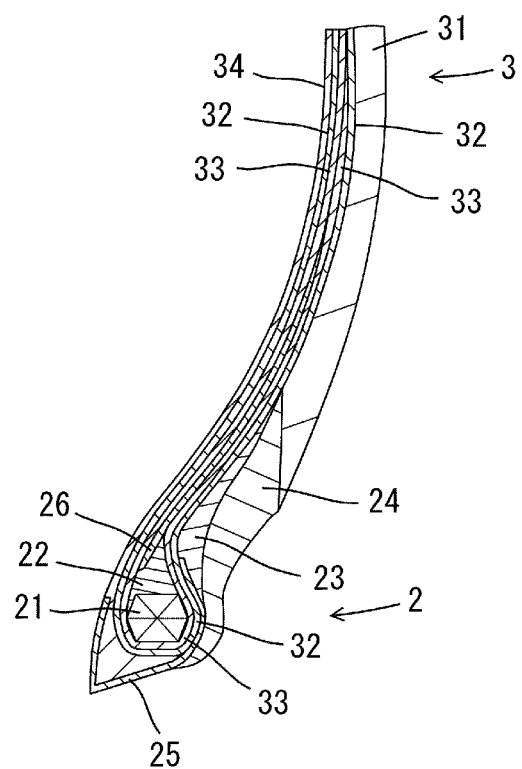
FIG. 2 is a cross-sectional view showing a configuration of a bead portion of a pneumatic tire according to an embodiment of the present invention.
Figure 3:
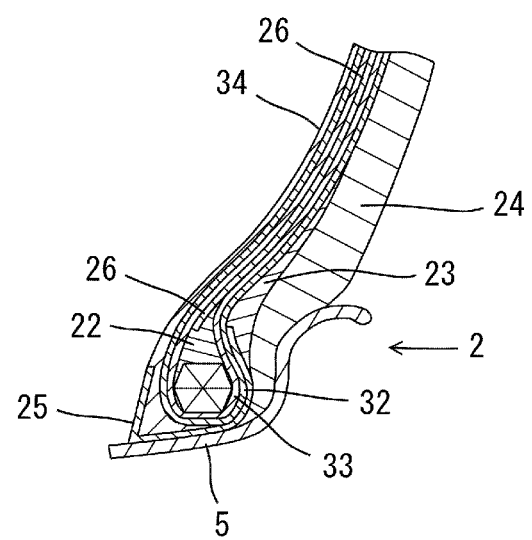
FIG. 3 is a cross-sectional view showing a bead portion in a state where a rim of a pneumatic tire according to an embodiment of the present invention is assembled.

Next, the present invention will be described in detail based on embodiments.
(1) Structure of Bead The tire of the present embodiment will be described with reference to FIGS. 1 to 3. FIG. 1 is a sectional view showing a configuration of a bead portion of a tire assembled with a rim, and FIG. 2 is an enlarged view thereof. FIG. 3 is a cross-sectional view showing a state where the rim is assembled.

In FIGS. 1 to 3, 1 is a tire, 2 is a bead portion, 3 and 31 are sidewall portions, 4 is a tread, 5 is a rim and 22 is a bead apex. In the tire 1, 23 is a bead reinforcing layer, and a clinch 24 which is an adjacent member is disposed adjacent to the bead reinforcing layer 23. In addition, 21 is a bead core, 25 is a chafer, and 26 is a strip apex. Further, 32 is a first carcass ply, 33 is a second carcass ply, and 34 is an inner liner.

As shown in FIG. 1, the bead reinforcing layer 23 of the present embodiment is disposed on the outer side in the tire axial direction (the right side in FIG. 1) of the carcass plies 32, 33. The tire axial direction is a direction parallel to the rotation axis of the tire, and the outer side in the tire axial direction means that it is outside in the axial direction when the plane passing through the tire equator (indicated by the line CL in FIG. 1) is the center.

In FIG. 1, the clinch 24 is disposed as an adjacent member of the bead reinforcing layer 23. However, in the case of a tire in which the clinch does not completely cover the outside of the bead reinforcing layer, the adjacent member of the bead reinforcing layer may be a sidewall or a sidewall and a clinch.
(2) Amine Type Antioxidant As described above, the bead reinforcing layer of the tire and the adjacent members of the bead reinforcing layer of the present embodiment contain an amine type antioxidant having an excellent ozone resistance effect. If the content of the amine type antioxidant in the bead reinforcing layer is too large, so-called scorching tends to occur at the time of vulcanization molding. If it is too little, migration of the antioxidant cannot be suppressed. Therefore, it is necessary to set the content of the antioxidant in the bead reinforcing layer in consideration of the balance with the content of the amine type antioxidant in the adjacent member.

In consideration of this point, in order to suppress migration of the amine type antioxidant from the adjacent member to the bead reinforcing layer, the content of the amine type antioxidant in the bead reinforcing layer is set to 0.3 to 8 parts by mass relative to 100 parts by mass of the rubber component of the bead reinforcing layer as well as the ratio (B/A) of the content A (wt %) of the amine type antioxidant in the bead reinforcing layer and the content B (wt %) of the amine type antioxidant in the adjacent members is set to 3 to 8 in the present embodiment. The content of the amine type antioxidant in the bead reinforcing layer relative to 100 parts by mass of the rubber component of the bead reinforcing layer is more preferably from 0.5 to 2.5 parts by mass, and further preferably from 1 to 1.5 parts by mass. Further, B/A is preferably 3 to 8, and further preferably 4 to 6.

The amine type antioxidant is not particularly limited, and examples thereof include amine derivatives such as diphenylamine type, p-phenylenediamine type, naphthylamine type, ketone amine condensate type. These may be used singly, or two or more of them may be used in combination. Examples of the diphenylamine derivative include p-(p-toluenesulfonylamide)-diphenylamine, octylated diphenylamine, 4,4'-bis(α,α'-dimethylbenzyl) diphenylamine and the like. Examples of the p-phenylenediamine-based derivatives include N-(1,3-dimethylbutyl)-N'-phenyl-p-phenylenediamine (6PPD), N-phenyl-N'-isopropyl-p-phenylenediamine (IPPD), N,N'-di-2-naphthyl-p-phenylenediamine and the like. Examples of naphthylamine derivatives include phenyl-α-naphthylamine and the like. Among these, phenylenediamine type and ketone amine condensate type are preferable.

Further, the amine type antioxidant contained in the bead reinforcing layer and the adjacent member may be a combination of the same or similar amine type antioxidants, or a combination of heterogeneous and different types of amine type antioxidants.

(3) Rubber Physical Properties of Bead Reinforcing Layer

Of the rubber physical properties of the bead reinforcing layer, by appropriately setting tan δ (loss tangent) at 70° C. and E* (complex modulus of elasticity), the following effects can be exerted, in addition to the effect of suppressing migration of the antioxidant from the adjacent member to the bead reinforcing layer.

(A) Tan δ (Loss Tangent) at 70° C.

The bead reinforcing layer of the tire of the present embodiment preferably has a tan δ at 70° C. (referred to simply as "tan δ") of 0.14 or less. More preferably 0.09 or less.

Then, for example, during driving on a tire for a multi-purpose sports car (SUV) or driving in a cold season, the deformation strain, that is, the flat spot is accumulated in the tire bead apex during a period until the tire temperature rises when the vehicle is started after stationary for a certain period, causing deterioration of fuel economy. However, by setting tan δ to the above value, occurrence of flat spots can be suppressed.

(B) E* (Complex Elastic Modulus)

The rubber composition constituting the bead reinforcing layer preferably has an E* at 70° C. of 10 MPa or more. More preferably 50 MPa or more, and particularly preferably 80 MPa or more.

By setting E* to the above value, sufficient handle responsiveness and steering stability can be secured.

The above tan δ and E* at 70° C. are measured with a viscoelasticity measuring device, for example, a viscoelasticity spectrometer manufactured by Iwamoto Seisakusho Co., Ltd. with a vulcanized rubber composition as an object to be measured at a frequency of 10 Hz, an initial strain of 10% and a dynamic strain of 5% at 70° C.

(4) Rubber Composition of Bead Reinforcing Layer

The rubber composition used for production of the bead reinforcing layer of the present embodiment can be obtained by kneading various ingredients such as a rubber component as a main component, a reinforcing material and additives together with the amine type antioxidant.

(A) Rubber Component

As the rubber component, for example, a diene rubber such as natural rubber (NR), isoprene rubber (IR), butadiene rubber (BR), styrene butadiene rubber (SBR), acrylonitrile butadiene rubber (NBR), chloroprene rubber (CR), butyl rubber (IIR) can be mentioned. Among them, NR, IR, BR and SBR are preferable from the viewpoint that steering stability, fuel economy and extrusion processability can be satisfactorily improved. Combined use of NR, BR and SBR and combined use of NR, IR and SBR are more preferable.

BR is not particularly limited, and for example, BR containing a high cis content, BR containing a syndiotactic polybutadiene crystal (SPB-containing BR) or the like can be used. Among them, SPB-containing BR is preferable from the viewpoint that extrusion processability can be greatly improved by the crystal component having inherent orientation.

When SPB-containing BR is used, the SPB content in the SPB-containing BR is preferably 15 to 40 parts by mass, more preferably 20 to 30 parts by mass, based on 100 parts by mass of the rubber component. When the content of SPB in SPB-containing BR is within the above range, extrusion processability can be secured. In addition, it is possible to raise E* of the rubber composition. The SPB content in SPB-containing BR is indicated by the amount of boiling n-hexane insoluble matter.

The content of BR is preferably 70 parts by mass or less, more preferably 50 parts by mass or less, based on 100 parts by mass of the rubber component. By setting the content of BR within the above range, sufficient durability can be secured and sufficient extrusion processability and elongation at break can be secured.

SBR is not particularly limited, and for example, emulsion-polymerized styrene butadiene rubber (E-SBR), solution-polymerized styrene butadiene rubber (S-SBR) or the like can be used. Among them, E-SBR is preferable from the viewpoint that carbon black can be well dispersed and workability is good.

The styrene content in the SBR is preferably 10 to 40 wt %, more preferably 20 to 30 wt %. By setting the styrene content within the above range, sufficient hardness and low fuel consumption can be secured.

The content of SBR is preferably 15 to 60 parts by mass, more preferably 25 to 40 parts by mass, based on 100 parts by mass of the rubber component. When the content of SBR is within the above range, sufficient extrusion processability can be secured and sufficient hardness and low fuel consumption can be secured.

The content of NR is preferably 20 to 80 parts by mass, more preferably 40 to 60 parts by mass, based on 100 parts by mass of the rubber component. By setting the NR content within the above range, sufficient breaking strength and sufficient hardness can be secured.

The content of IR is preferably 5 to 50 parts by mass, more preferably 15 to 30 parts by mass, based on 100 parts by mass of the rubber component. When the content of IR is within the above range, processability can be improved and sufficient elongation at break can be secured.

(B) Carbon Black

It is preferable to blend carbon black as a reinforcing material in the rubber composition of this embodiment. As the carbon black, for example, GPF, HAF, ISAF, SAF, FF, FEF and the like can be mentioned. One of these may be used alone, or two or more of them may be used in combination. Among them, from the viewpoint of achieving both extrusion processability and necessary hardness, it is preferable to use a combination of soft carbon type FEF and hard carbon type ISAF, SAF, HAF, and a combination use of ISAF and FEF is more preferable.

The content of carbon black in the rubber composition is preferably from 30 to 70 parts by mass, more preferably from 45 to 65 parts by mass, based on 100 parts by mass of the rubber component. By setting the amount of carbon black in the rubber composition within the above range, excessive increase in E* can be suppressed and the value of tan δ of the rubber composition can be further lowered.

Also, from the viewpoint of extrudability, the carbon black preferably contains carbon black having a cetyltrimethylammonium bromideadsorption (CTAB) specific surface area of 30 to 50 $m^2/g$. As carbon black having CTAB specific surface area within the above range, for example, FEF can be mentioned. As the rubber composition of the present embodiment, it is particularly preferable that carbon black having a CTAB adsorption specific surface area of 30 to 50 $m^2/g$ is contained in an amount of 30 to 60 parts by mass based on 100 parts by mass of the rubber component. The CATB adsorption specific surface area can be measured in accordance with JIS K 6217-3: 2001.

(C) Inorganic Filler

In the rubber composition of the present embodiment, it is preferable to contain an inorganic filler when not using soft carbon/hard carbon in combination. Examples of the inorganic filler include calcium carbonate, talc, hard clay, Austin black, fly ash, mica and the like. Among these, calcium carbonate and talc are preferable from the viewpoints of low self-cohesiveness, difficulty to be a fracture nucleus during running, good durability and high Improvement effect in extrusion processability (particularly extrusion edge property). And calcium carbonate is more preferable.

The average particle diameter (average primary particle diameter) of the inorganic filler is preferably 1 to 100 μm, and more preferably 2 to 50 μm. When the average particle diameter of the inorganic filler is within the above range, deterioration of the durability due to the inorganic filler becoming a fracture core is suppressed. In addition, it is possible to secure sufficient workability at the time of extrusion. The average particle diameter of the inorganic filler can be measured by, for example, a laser diffraction/scattering method (Microtrack method).

The content of the inorganic filler is preferably 10 to 25 parts by mass with respect to 100 parts by mass of the rubber component. Setting the amount of the inorganic filler within the above range makes it possible to improve the processability without impairing the balance between E* and tan δ.

(D) Phenol Type Resin

The rubber composition of the present invention may contain a phenol type resin. Specific examples of the phenol type resins include phenol resins, modified phenol resins, cresol resins, modified cresol resins and the like. The above-mentioned phenol resin is obtained by reacting phenol with aldehydes such as formaldehyde, acetaldehyde, furfural etc. with an acid or alkali catalyst. The above-mentioned modified phenol resin is a phenol resin modified with a compound such as cashew oil, tall oil, linseed oil, various animal or vegetable oils, an unsaturated fatty acid, rosin, an alkylbenzene resin, aniline, melamine, or the like.

The phenol type resin is preferably a modified phenol resin from the viewpoint that a hard composite sphere is formed by obtaining a sufficient hardness by a curing reaction or a large composite sphere is formed. And a cashew oil modified phenol resin, rosin modified phenol resin is more preferable.

The content of the phenol type resin is preferably from 5 to 20 parts by mass, more preferably from 10 to 20 parts by mass, based on 100 parts by mass of the rubber component. When the total content of the phenol type resin is within the above range, sufficient hardness can be secured and low fuel consumption can be secured.

(E) Other

In the rubber composition of the present invention of the present embodiment, in addition to the above components, the compounding materials conventionally used in the rubber industry such as oil, stearic acid, zinc white, sulfur, vulcanization accelerator, etc. may be blended if necessary. The blending amount of each blended material can be appropriately selected.

The rubber composition of the present embodiment usually contains sulfur. The sulfur content is preferably 1 to 8 parts by mass, more preferably 2 to 6 parts by mass, based on 100 parts by mass of the rubber component. By setting the content of sulfur within the above range, sufficient steering stability can be secured, blooms and adhesiveness of sulfur can be suppressed, and durability can be secured.

The sulfur content is the pure sulfur content, and when insoluble sulfur is used, it is the content excluding the oil content.

The rubber composition of the present invention usually contains a vulcanization accelerator. The content of the vulcanization accelerator is preferably from 1.5 to 5.0 parts by mass, more preferably from 2 to 4 parts by mass, based on 100 parts by mass of the rubber component.

(5) Production Method of Rubber Composition

The rubber composition can be produced by a known method, for example, kneading each of the above components using a rubber kneading apparatus such as open roll, Banbury mixer or the like.

(6) Manufacture of Tires

The tire of the present embodiment can be produced by an ordinary method using the above rubber composition. That is, the rubber composition is extruded in accordance with the shape of the bead apex at the stage of unvulcanization, molded by a usual method on a tire molding machine and bonded together with other tire members to form an unvulcanized tire. The unvulcanized tire is heated and pressed in a vulcanizer to produce a tire.

Thereby, it is possible to provide a pneumatic tire having excellent durability in which the migration of the amine type antioxidant from the adjacent member to the bead reinforcing layer is suppressed.

The application of the tire of the present embodiment is not particularly limited, and it can be used for various vehicles such as passenger cars, heavy load vehicles, motocross, and the like.

EXAMPLE

Examples

Next, the present invention will be described in more detail with reference to examples. In the following examples, side walls are disposed as adjacent members. The content of various materials (blended materials such as rubber and an antioxidant) in the rubber composition is shown in parts by mass per 100 parts by mass of the rubber component. The contents A and B of the amine type antioxidant are indicated by wt %.

[1] Experiment 1

1. Preparation of Rubber Composition (1) Rubber Composition of Sidewall (Adjacent Member of Bead Reinforcing Layer)

Using the following materials, sidewall rubber compositions were prepared with three blends of SW 1, SW 2, and SW 3 shown in Table 1. In Table 1, parts by mass are shown except for the content B (wt %) of the amine type antioxidant in the adjacent member.

(Rubber Component)
NR: TSR 20
BR: UBEPOL BR 150 B (manufactured by Ube Industries, Ltd.)

(Reinforcing Material)
Carbon black: FEF, N 550 (manufactured by Showa Cabot Co., Ltd.)

(A Softening Agent)
Oil: Diana process AH-24 (manufactured by Idemitsu Kosan Co., Ltd.)

(Amine Type Antioxidant)
Antioxidant 6C: Nocrac 6 C (phenylenediamine type antioxidant) (manufactured by Ouchi Shinko Chemical Industrial Co., Ltd.)

Antioxidant RD: Nocrac RD (ketone amine condensate type antioxidant) (manufactured by Ouchi Shinko Chemical Industrial Co., Ltd.)
(Vulcanization Aid)
Stearic acid: Camellia (manufactured by NOF CORPORATION)
Zinc oxide: Zinc white (manufactured by Mitsui Mining & Smelting Co., Ltd.)
(Vulcanizing Agent)
Sulfur: 5% Oil-extended sulfur (manufactured by Tsurumi Chemical Industry Co., Ltd.)
Accelerator: Soxinol CZ (CZ, manufactured by Sumitomo Chemical Co., Ltd.)
(Other)
Wax: Sannock N (manufactured by Ouchi Shinko Chemical Industrial Co., Ltd.)

TABLE 1

|  | SW1 | SW2 | SW3 | SW4 |
| --- | --- | --- | --- | --- |
| NR | 40 | 40 | 40 | 40 |
| BR | 60 | 60 | 60 | 60 |
| Carbon black N550 | 48 | 48 | 48 | 48 |
| Oil | 5 | 5 | 5 | 5 |
| Wax | 1.2 | 1.2 | 1.2 | 1.2 |
| Antioxidant 6C | 3 | 8 | 0.5 | 6 |
| Antioxidant RD | 1 | 2 | 1 | 1 |
| Stearic acid | 2.5 | 2.5 | 2.5 | 2.5 |
| Zinc oxide | 3 | 3 | 3 | 3 |
| Sulfur | 1.58 | 1.58 | 1.58 | 1.58 |
| Accelerator CZ | 0.90 | 0.90 | 0.90 | 0.90 |
| Total amount | 166.18 | 172.18 | 163.68 | 169.18 |
| Content B (wt %) | 2.4 | 5.8 | 0.9 | 4.1 |

(2) Rubber Composition of Bead Reinforcing Layer

Using the following materials, a rubber composition of a bead reinforcing layer was prepared with four blending formulations AP 1, AP 2, AP 3, and AP 4 shown in Table 2. In Table 2, parts by mass are shown except for the content A (wt %) of the amine type antioxidant in the bead reinforcing layer. The content shown in the lowermost part of Table 2 is the content (parts by mass) of the amine type antioxidant in the rubber composition.
(Rubber Component)
NR: TSR 20
SBR: JSR 1502 (emulsion polymerization SBR (E-SBR)), styrene content 23.5 wt %
(Reinforcing Material)
Carbon black: ISAF, N 220 (manufactured by Showa Cabot Co., Ltd.), CTAB adsorption specific surface area 110 m²/g
T-NS, N 330 T (manufactured by Showa Cabot Co., Ltd.), CTAB adsorption ratio table area 78 m²/g
FEF, N 550 (manufactured by Showa Cabot Co., Ltd.), CTAB adsorption specific surface area 42 m 2/g
(Calcium Carbonate) NS # 200 (Manufactured by Nitto Denpa Kogyo Co., Ltd.)
(Phenol Resin) Sumilite Resin PR12686 (Novolak Type Phenol Resin) (Manufactured by Sumitomo Bakelite Co., Ltd.)
(Vulcanization Aid)
Stearic acid: Camellia (manufactured by NOF CORPORATION)
Zinc oxide: Zinc white (manufactured by Mitsui Mining & Smelting Co., Ltd.)
(Antioxidant)
Antioxidant 6 C: Nocrac 6 C (phenylenediamine type antioxidant) (manufactured by Ouchi Shinko Chemical Industrial Co., Ltd.)
(A Softening Agent)
Oil: process oil A/O MIX (manufactured by Sankyo Yuka Kogyo Co., Ltd.)
(Vulcanizing Agent)
Sulfur: M95 M/S (oil-extended insoluble sulfur manufactured by Nippon Drying Co., Ltd.)
Accelerator: HMT, Sansea H-T (manufactured by Sanshin Chemical Industry Co., Ltd.)
NS, Sancera NS-G (manufactured by Sanshin Chemical Industry Co., Ltd.)

TABLE 2

|  | AP1 | AP2 | AP3 | AP4 | AP5 |
| --- | --- | --- | --- | --- | --- |
| NR | 60 | 60 | 60 | 60 | 60 |
| SBR | 40 | 40 | 40 | 40 | 40 |
| Carbon black N220 |  |  | 10 |  |  |
| Carbon black N330T | 60 | 60 |  | 45 | 45 |
| Carbon black N550 |  |  | 40 |  |  |
| Calcium carbonate |  |  |  | 15 | 15 |
| Phenol resin | 5 | 5 | 8 | 13 | 13 |
| Stearic acid | 2 | 2 | 2 | 2 | 2 |
| Zinc oxide | 3 | 3 | 3 | 3 | 3 |
| Antioxidant 6C |  | 1 | 1 | 1 | 1.5 |
| Process oil | 5 | 5 | 5 | 5 | 5 |
| Sulfur | 4 | 4 | 4 | 4 | 4 |
| Accelerator HMT | 0.5 | 0.5 | 0.8 | 1.3 | 1.3 |
| NS | 2.35 | 2.35 | 2.35 | 2.35 | 2.35 |
| Total amount | 181.85 | 182.85 | 176.15 | 191.65 | 192.15 |
| Content A (wt %) | 0 | 0.52 | 0.57 | 0.52 | 0.78 |
| Content (Parts by mass) | 0 | 1 | 1 | 1 | 1.5 |

2. Measurement of Physical Properties of Rubber

"Tan δ" and "E*" of the rubber compositions AP 1 to AP 5 of the produced bead reinforcing layer at 70° C. were measured. Measurement was carried out at 70° C. under the conditions of a frequency of 10 Hz, an initial strain of 10%, and a dynamic strain of 5%, using a viscoelasticity device; a viscoelasticity spectrometer manufactured by Iwamoto Seisakusho Co., Ltd. with a vulcanized rubber composition as a measurement.

TABLE 3

|  | AP1 | AP2 | AP3 | AP4 | AP5 |
| --- | --- | --- | --- | --- | --- |
| tanδ (70° C.) | 0.16 | 0.16 | 0.08 | 0.08 | 0.08 |
| E* (70° C.) | 15 | 15 | 20 | 58 | 58 |

The results of the measurement are shown in Table 3. As shown in Table 3, in AP 1 and AP 2, E* was 10 MPa or more but tan δ was 0.16. In AP 3, tan δ was 0.09 or less and E* was 10 MPa or more, showing good results. Furthermore, in the compositions of AP 4 and AP 5, tan δ was 0.09 or less and E* was 50 MPa or more and particularly good results were obtained.

3. Preparation of Test Tire (1) Example 1

As shown in Table 4, ordinary tires (195/65R15) in which sidewalls were arranged with respect to the bead reinforcing layer were produced using the rubber compositions SW1 for the sidewall and AP3 for the bead reinforcing layer.

(2) Examples 2 and 3

As shown in Table 4, in Example 2, in the same manner as in Example 1, except that the externally bonded structure in which the sidewalls were disposed adjacently to the bead reinforcing layer in the axially outer side of the tire was used, a tire (195/65R15) was prepared. In Example 3, a test tire was prepared in the same manner as in Example 2 except that AP 4 was used as the rubber composition of the bead reinforcing layer.

(3) Examples 4 to 6

In Examples 4 to 6, a test tire was prepared in the same manner as in Example 2 except that the rubber composition shown in Table 4 was used for each of the sidewall and the bead reinforcing layer to form an externally bonded structure.

(4) Comparative Example 1

As shown in Table 5, a test tire was prepared in the same manner as in Example 1 except that the rubber composition AP 1 was used for the bead reinforcing layer.

(5) Comparative Examples 2 to 6

As shown in Table 5, in Comparative Example 2, a test tire was prepared in the same manner as in Example 2 except that the rubber composition AP 1 was used for the bead reinforcing layer. In Comparative Examples 3 and 4, test tires were prepared in the same manner as in Comparative Example 2, except that rubber compositions SW 2 and SW 3 were used for the sidewalls, respectively. In Comparative Example 5, a test tire was prepared in the same manner as in Comparative Example 2 except that the rubber composition SW 3 was used for the sidewall and the rubber composition AP 2 was used for the bead reinforcing layer. In Comparative Example 6, a test tire was prepared in the same manner as in Comparative Example 2 except that the rubber composition SW 2 was used for the sidewall and the rubber composition AP 3 was used for the bead reinforcing layer.

(6) Comparative Examples 7 to 9

In Comparative Examples 7 to 9, a test tire was prepared in the same manner as in Comparative Example 2 except that the rubber composition shown in Table 4 was used for each of the sidewall and the bead reinforcing layer to form an externally bonded structure.

4. Evaluation Method

(1) Processability

The scrap rate at the time of intermediate processing was determined, indexed based on the following formula with reference to Comparative Example 1 and evaluated. The larger the value, the better it is.

Processability=[Scrap rate (Comparative Example 1)/Scrap rate (Evaluation object)]×100

(2) Steering Stability

The test tire was mounted on all wheels of a vehicle (domestic FF car, displacement 2000 cc), running a dry asphalt tire test course at a speed of 80 km/h for 2 hours, and the steering stability (steering response, Grip feeling, etc.) were sensory-evaluated by the driver. Evaluation was indexed, based on Comparative Example 1, according to the following formula. The larger the value, the better it is.

Steering stability=[steering stability (evaluation object)/steering stability (comparative example 1)]×100

(3) Crack Resistance

The test tire was exposed for a period of 9 days under the conditions of an ozone concentration of 50 pphm and an atmospheric temperature of 40° C. to check the occurrence of cracks and determine the defective rate (C defective rate) due to the occurrence of cracks. The defective rate was indexed, based on Comparative Example 1, by the following formula and evaluated. The larger the value, the better it is.

Crack resistance performance=[C defective rate (Comparative example 1)/C defective rate (object to be evaluated)]×100

(4) Appearance Performance

Exposure of ten test tires each for half a year outdoors, visual inspection of the state of precipitation of the antioxidant on the surface of the side walls, and the fraction defective (E defect rate) by precipitation was determined. Based on Comparative Example 1, E defect rate was indexed and evaluated. The larger the value, the better it is.

Appearance performance=[E defect rate (Comparative example 1)/E defect rate (object to be evaluated)]×100

5. Evaluation Results

The evaluation results of Examples 1 to 6 are shown in Table 4, and the evaluation results of Comparative Examples 1 to 9 are shown in Table 5. In Tables 4 and 5, the rubber compositions and the values of B/A in the respective Examples and Comparative Examples are also shown.

TABLE 4

| | Examples | | | | | |
| --- | --- | --- | --- | --- | --- | --- |
| | 1 | 2 | 3 | 4 | 5 | 6 |
| Rubber Composition (SW) | SW1 | SW1 | SW1 | SW4 | SW4 | SW1 |
| Content B | 2.4 | 2.4 | 2.4 | 4.1 | 4.1 | 2.4 |
| Rubber Composition (AP) | AP3 | AP3 | AP4 | AP3 | AP4 | AP5 |
| Content A | 0.57 | 0.57 | 0.52 | 0.57 | 0.52 | 0.78 |
| B/A | 4.2 | 4.2 | 4.6 | 7.2 | 7.9 | 3.1 |
| Bead Structure | Normal | | Reinforcing Layer | | | |
| Processability | 120 | 120 | 130 | 120 | 130 | 128 |
| Steering stability | 100 | 125 | 150 | 125 | 150 | 150 |
| Crack resistance | 100 | 115 | 110 | 115 | 118 | 112 |
| Appearance Performance | 100 | 105 | 110 | 110 | 108 | 103 |

TABLE 5

| | Comparative Examples | | | | | | | | |
| --- | --- | --- | --- | --- | --- | --- | --- | --- | --- |
| | 1 | 2 | 3 | 4 | 5 | 6 | 7 | 8 | 9 |
| Rubber Composition (SW) | SW1 | SW1 | SW2 | SW3 | SW3 | SW2 | SW3 | SW2 | SW3 |

TABLE 5-continued

|  | Comparative Examples | | | | | | | | |
|---|---|---|---|---|---|---|---|---|---|
|  | 1 | 2 | 3 | 4 | 5 | 6 | 7 | 8 | 9 |
| Content B | 2.4 | 2.4 | 5.8 | 0.9 | 0.9 | 5.8 | 0.9 | 5.8 | 0.9 |
| Rubber Composition (AP) | AP1 | AP1 | AP1 | AP1 | AP2 | AP3 | AP3 | AP4 | AP4 |
| Content A | 0 | 0 | 0 | 0 | 0.52 | 0.57 | 0.57 | 0.52 | 0.52 |
| B/A | — | — | — | — | 1.7 | 10.2 | 1.6 | 11.2 | 1.7 |
| Bead Structure | Normal | | | | Reinforcing Layer | | | | |
| Processability | 100 | 100 | 100 | 100 | 80 | 120 | 120 | 130 | 130 |
| Steering stability | 100 | 120 | 120 | 120 | 120 | 135 | 135 | 150 | 150 |
| Crack resistance | 100 | 80 | 100 | 50 | 60 | 110 | 60 | 110 | 60 |
| Appearance Performance | 100 | 90 | 70 | 90 | 85 | 50 | 85 | 50 | 85 |

It is shown from Tables 4 and 5 that the processabilities in all examples are 120 or more in comparison with Comparative Example 1 having a normal structure, and, regarding Comparative Examples 2 to 9, the processabilities in all the comparative examples excluded Comparative Example 5 are also 100 or more. As a result of the test, it is understood that good processability can be obtained by using the externally bonded structure.

The steering stabilities were good in all Examples and Comparative Examples.

The crack resistances were good in all the examples, and particularly in Example 5, it was very good as 118. On the other hand, in Comparative Example 4, Comparative Example 5, Comparative Example 7 and Comparative Example 9 in which the concentration of the amine-based antioxidant in the sidewall is low, and in Comparative Example 2 in which the antioxidant is not contained, cracks Occurrences were observed.

The appearance performances were good in all the examples, and, particularly in Example 3 and Example 4, they were extremely good as 110. On the other hand, precipitations of the antioxidant were observed most frequently in Comparative Example 6 and Comparative Example 8 in which the concentration of the amine type antioxidant in the sidewall was the highest. In Comparative Examples 2 to 4 in which the antioxidant was not contained in the apex, precipitation were also observed. In addition, precipitations were also observed in Comparative Example 5, Comparative Example 7 and Comparative Example 8.

In addition, in the tire in which apex rubber composition did not contain a predetermined amount of amine type antioxidant, and the B/A was not within the predetermined range, either performance deterioration was observed. Even in a tire containing an amine type antioxidant in a rubber composition of Apex, in Comparative Example 6 and Comparative Example 8 which are comparative examples having a high B/A, deteriorations in any of the performances, particularly, deterioration in appearance performance, were observed. In Comparative Example 5, Comparative Example 7 and Comparative Example 9 which are comparative examples having a low B/A, deteriorations in any of the performances, particularly cracking resistance deterioration, were observed. On the other hand, in the case of Examples 1 to 6 in which B/A was within the range of 3 to 8, deteriorations in the tested performances were not observed. Particularly in Examples 2 to 6, improvements in the performances were seen.

Also, good test results were obtained on tires using AP 4 and AP 5 having a tan δ at 70° C. of 0.09 or less and E* of 50 or more in the bead reinforcing layer. It was suggested that it is preferable to use a rubber composition having a value of tan δ and E* in the numerical range for the bead reinforcing layer.

[2] Experiment 2

1. Migration Test of Antioxidant

Tires in Example 3 (B/A=4.6) and in Comparative Example 8 (B/A=11.2) in which the same rubber composition (AP 4) are used for the bead reinforcing layer, but only the amine type antioxidant amounts of the sidewall are different and, as a result, B/A are different each other, were used, and change and rate of increase of the content A (wt %) of the amine type antioxidant in the bead reinforcing layer by the migration were tested. The test period was 180 days, and the contents A of the amine type antioxidant in the bead reinforcing layer at the start (0 day) and after 14, 30 and 180 days were measured by liquid chromatography.

2. Evaluation Results

The evaluation results of Example 3 and Comparative Example 8 are shown in Table 6.

TABLE 6

|  |  | Number of days since the start | | | |
|---|---|---|---|---|---|
|  |  | 0 | 14 | 30 | 180 |
| Example 3 | Content A | 0.52 | 0.54 | 0.58 | 0.8 |
|  | Rate of increase | 0% | 4% | 16% | 60% |
| Comparative Example 8 | Content A | 0.52 | 0.8 | 1.1 | 1.9 |
|  | Rate of increase | 0% | 57% | 116% | 273% |

It was shown form result of the test, in Comparative Example 8 in which B/A was 11.2, the content rate after 180 days was 1.9 wt % and the rate of increase was 273%, while, in Example 3 in which B/A was 4.6, the content rate after 180 days was 0.8 wt % and the rate of increase was 60%, and a significant suppression effect of migration was observed.

Although the present invention has been described based on the embodiments, the present invention is not limited to the above-described embodiments. Various modifications can be made to the above embodiment within the same and equivalent scope as the present invention.

DESCRIPTION OF THE REFERENCE NUMERALS

1. Tire
2. bead part
3. Side wall part
4. Tread
5. Rim
21. Bead core
22. Bead apex
23. Bead reinforcing layer
24. Clinch
25. Chafer
26. Strip apex
31. Sidewall part
32. First carcass ply
33. Second carcass ply
34. Inner liner
CL. Tire Equator

What is claimed is:

1. A pneumatic tire comprising:
a tread;
a sidewall;
a bead portion having a bead core;
a bead reinforcing layer reinforcing the bead portion;
a bead apex; and
a carcass ply moored on a bead core of the bead portion, wherein
the bead reinforcing layer is not in direct contact with the bead core and bead apex, the bead reinforcing layer and adjacent members adjacent to the bead reinforcing layer are each constituted of a rubber composition containing an amine type antioxidant,
the rubber composition constituting the bead reinforcing layer comprises a rubber component containing natural rubber (NR) and/or isoprene rubber (IR),
the rubber composition constituting the bead reinforcing layer has a tan δ at 70 ° C. of 0.09 or less and E* at 70° C. of 50 MPa or more,
0.3 to 8 parts by mass of the amine type antioxidant is contained in the bead reinforcing layer based on 100 parts by mass of the rubber component, and
the adjacent members adjacent to the bead reinforcing layer and the bead reinforcing layer satisfy the following formula,

3≤B/A≤8

A: Content (wt %) of amine type antioxidant in bead reinforcing layer
B: Content (wt %) of amine type antioxidant in the adjacent members.

2. A pneumatic tire comprising:
a tread;
a sidewall;
a bead portion having a bead core;
a bead reinforcing layer reinforcing the bead portion;
a bead apex; and
a carcass ply moored on a bead core of the bead portion, wherein
the bead reinforcing layer is not in direct contact with the bead core and bead apex,
the bead reinforcing layer and adjacent members adjacent to the bead reinforcing layer are each composed of a rubber composition containing an amine type antioxidant,
the rubber composition constituting the bead reinforcing layer comprises a rubber component containing 20 parts by mass or more of natural rubber (NR) and/or 15 parts by mass or more of isoprene rubber (IR) based on 100 parts by mass of the rubber component, the rubber composition constituting the adjacent members comprises natural rubber (NR) and/or butadiene rubber (BR),
0.3 to 8 parts by mass of the amine type antioxidant is contained in the bead reinforcing layer based on 100 parts by mass of the rubber component,
the adjacent members adjacent to the bead reinforcing layer and the bead reinforcing layer satisfy the following formula,

3B/A≤8

A: Content (wt %) of amine type antioxidant in bead reinforcing layer
B: Content (wt %) of amine type antioxidant in the adjacent members.

3. A pneumatic tire comprising;
a tread;
a sidewall;
a bead portion having a head core;
a bead reinforcing layer reinforcing the bead portion;
a bead apex: and
a carcass ply moored on a bead core of the bead portion, wherein
the bead reinforcing layer is not in direct contact ith the bead core and bead apex,
the head reinforcing layer and at least one adjacent meniber adjacent to the bead reinforcing layer are each composed of a rubber composition containing a rubber component and an amine type antioxidant,
0.3 to 8 parts by mass of the amine type antioxidant is contained in the bead reinforcing layer based on 100 parts by mass of the rubber component,
the at least one adjacent member adjacent to the bead reinforcing layer and the bead reinforcing layer satisfy the following formula,

3≤B/A≤8

A: Content (wt %) of amine type antioxidant in the bead reinforcing layer
B: Content (wt %) of amine type antioxidant in the at least one adjacent member.

4. The pneumatic according to claim 3, wherein
the at least one adjacent member adjacent to the bead reinforcing layer is a sidewall or a clinch, and
the bead reinforcing layer is provided outside the end portion of the carcass ply in the axial direction of the tire.

5. The pneumatic tire according to claim 3, wherein the rubber composition constituting the bead reinforcing layer has a tan δ at 70° C. of 0.14 or less.

6. The pneumatic tire according to claim 3, wherein the rubber composition constituting the bead reinforcing layer has a tan δ at 70° C. of 0.09 or less.

7. The pneumatic tire according to claim 3, wherein the rubber composition constituting the bead reinforcing layer has an E* at 70° C. of 10 MPa or more.

8. The pneumatic tire according to claim 3, wherein the rubber composition constituting the bead reinforcing layer has E* at 70° C. of 50 MPa or more at 70° C.

9. The pneumatic tire according to claim 3, wherein the rubber composition constituting the bead reinforcing layer contains 30 to 60 parts by mass of carbon black having a cetyltrimethylammonium brat (CTAB) adsorption specific surface area of 30 to 50 m²/g or 10 to 25 pails by mass of calcium carbonate based on 100 parts by mass of the rubber component.

10. The pneumatic tire according to claim 3, wherein the rubber composition constituting the bead reinforcing layer contains 45 to 65 parts by mass of carbon black based on 100 parts by mass of the rubber component in the rubber composition.

11. The pneumatic tire according to claim 3, wherein the rubber composition constituting the bead reinforcing layer contains carbon black having a cetyltrimethylammonium bromide (CTAB) adsorption specific surface area of not more than 50 m$^2$/g.

12. The pneumatic tire according to claim 3, wherein the rubber composition constituting the bead reinforcing layer contains a phenol type resin.

13. The pneumatic tire according to claim 3, wherein the adjacent members and the bead reinforcing layer satisfy the formula:

$$4 \leq B/A \leq 6$$

14. The pneumatic tire according to claim 3, wherein the rubber composition constituting the bead reinforcing layer contains an inorganic filler.

15. The pneumatic tire according to claim 1, wherein 0.5 to 2.5 parts by mass of the amine type antioxidant is contained in the bead reinforcing layer based on 100 parts by mass of the rubber component in the bead reinforcing layer.

16. The pneumatic tire according to claim 15, wherein 1 to 1.5 parts by mass of the amine type antioxidant is contained in the bead reinforcing layer based on 100 parts by mass of the rubber component in the bead reinforcing layer.

* * * * *